United States Patent [19]
Poppelreiter, II

[11] 3,818,240

[45] June 18, 1974

[54] ELECTRICAL PHASE MONITORING CIRCUIT

[75] Inventor: Joseph C. Poppelreiter, II, Sterling Heights, Mich.

[73] Assignee: Kubik Hydradrives, Inc., Troy, Mich.

[22] Filed: May 4, 1973

[21] Appl. No.: 357,400

[52] U.S. Cl. .................................. 307/127, 317/48
[51] Int. Cl. .......................................... H01h 83/18
[58] Field of Search .......... 307/127; 317/13, 33, 46, 317/48, 130

[56] References Cited
UNITED STATES PATENTS

| | | | |
|---|---|---|---|
| 3,395,324 | 7/1968 | Rager, Jr. | 307/127 X |
| 3,428,865 | 2/1969 | Opad | 307/127 X |
| 3,495,130 | 2/1970 | Bruner et al. | 307/127 X |
| 3,708,719 | 1/1973 | Ishikawa | 307/127 X |
| 3,727,103 | 4/1973 | Finch et al. | 307/127 X |

Primary Examiner—Gene Z. Rubinson
Attorney, Agent, or Firm—Andrew R. Basile

[57] ABSTRACT

An electrical circuit for monitoring or indicating the sequence of electrical phases or the direction of rotation of a multi-phase electrical motor. The rotation monitor includes a delta connected arrangement of a capacitor in one arm, a resistor in another arm, and the third arm including the parallel combination of a light and a lamp of a photocell unit. The three terminals of the delta arrangement are connected to the three-phase conductors of a source or electrical apparatus to be tested, the terminals on either side of the parallel arrangement of lamp and light are connected through the intermediary of two equal resistors. If the phase relationship is correct, the lamp and the light will be energized, and a photosensitive resistor associated with the photocell will turn on a triac whose output can be used for many applications.

5 Claims, 3 Drawing Figures

3,818,240

ELECTRICAL PHASE MONITORING CIRCUIT

The present invention relates to an electrical monitoring circuit for indicating the sequence of phases of a multi-phase electrical apparatus. In particular, the present invention provides an electrical circuit for monitoring or indicating the sequence of electrical phases or the direction of rotation of a three-phase electrical motor.

BACKGROUND OF THE INVENTION

When a multi-phase electrical apparatus, such as a three-phase motor, is included in various machines, such machines could be severely damaged when the motor runs in an incorrect or reverse direction, as would occur with a reversal of phasing. While the reversal of phasing is not a common type of protection, when it is needed it can prevent costly damage. Conventionally, reverse-phase protection has been attempted to be accomplished by the use of a phase-sensitive relay having its contacts operatively and electrically connected in series with the holding coil of the starter. This technique has serious disadvantages, and in addition does not provide any visual indication to an operator or anyone else of the correct or incorrect rotation direction of the motor.

Another suggestion which would provide at least a visual indication of the rotation direction of a three-phase motor is found in the Source Book of Electronic Circuits, by John Markus, McGraw Hill Book Company, on page 474 where a circuit for a so-called "phase indicator" is briefly described. In contrast to the teaching of such publication, the present invention not only provides a visual indication of the correct phasing, but also utilizes the indicator circuit to generate photoemissively a signal for a control circuit, the input impedance of which does not load down or impair the functioning of the indicator circuit.

The present invention eliminates the disadvantages attendant with the conventional and prior art techniques, and also provides an electrical apparatus which will accomplish the necessary protection for multi-phase electrical devices and also provides a visual indication of correct phasing and motor rotation.

SUMMARY OF THE INVENTION

The present invention provides an electrical monitoring circuit for indicating the sequence of phases of a multi-phase electrical apparatus. The monitoring circuit is used in conjunction with a multi-phase electrical apparatus which is operatively and electrically connected to a source of electrical energy, and wherein the multi-phase electrical apparatus is provided with a plurality of input conductors. The circuit includes first, second, third and fourth impedance means each having first and second electrical terminals. The first impedance means has its first electrical terminal operatively and electrically connected to a first of the input conductors of the multi-phase electrical apparatus, and has its second electrical terminal operatively and electrically connected to the first terminal of the second impedance means. The second impedance means has its second electrical terminal operatively and electrically connected to a second of the input conductors of the multi-phase electrical apparatus. The third impedance means has its first electrical terminal operatively and electrically connected to the second input conductor of the electrical apparatus, and its second electrical terminal operatively and electricall connected to the first electrical terminal of the fourth impedance means. The fourth impedance means has its second electrical terminal operatively and electrically connected to a third input conductor of the multi-phase electrical apparatus. The monitoring circuit also includes electrical circuit means which are operatively and electrically connected between the second electrical terminal of the first impedance means and the second electrical terminal of the third impedance means. The electrical circuit means includes photoemissive means. Photosensitive means is disposed in a predetermined spacial relation relative to the photoemissive means, whereby the impedance of the photosensitive means varies as a function of the light emitted by the photoemissive means. Utilization means are operatively and electrically connected to the photosensitive means, whereby the utilization means is controlled by the impedance of the photosensitive means. The photoemissive means will become energized when the sequence of phases of the multi-phase electrical apparatus is in a predetermined succession of phases, and the photoemissive means will not become energized if the sequence of phases of the multi-phase electrical apparatus differs from the predetermined succession of phases.

The present invention also provides an electrical monitoring circuit similar to that described above, but which also includes fifth impedance means which is operatively and electrically connected to the photoemissive means, and the electrical circuit means includes the fifth impedance means and the photoemissive means.

In an example of a preferred embodiment of the present invention, the first, third, and fourth impedance means have substantially equal electrical impedance values.

The present invention also provides an electrical monitoring circuit as described above, wherein the photosensitive means includes a photosensitive resistor, and the utilization means includes a bilateral gate electrode controlled solid-state switch, a capacitive element, and a variable impedance element. The bilateral gate electrode controlled solid-state switch is provided with a first power electrode, a second power electrode, and a gate electrode. The photosensitive resistor is operatively and electrically connected between the gate electrode and the first power electrode of the bilateral gate electrode controlled solid-state switch. The capacitive element is operatively and electrically connected between the gate electrode and the second power electrode of the bilateral gate electrode controlled solid-state switch. The variable impedance element is operatively and electrically connected between the first and second power electrodes of the bilateral gate electrode controlled solid-state switch. It is an object of the present invention to provide an electrical monitoring circuit as described above, wherein the photoemissive means and the photosensitive means comprises a photocell unit. The photoemissive means includes a lamp, and the photosensitive means comprises a photosensitive resistor. When the lamp is energized, the photosensitive resistor will decrease in resistance value, thereby causing more electrical potential to be developed across the capacitive element which in turn causes the bilateral gate electrode controlled solid-state switch to become conductive.

It is an additional object of the invention to provide a monitoring circuit wherein the electrical circuit means includes a light connected in parallel with the lamp, and the parallel combination of the light and the lamp is connected in series with a resistor. When the light and the lamp are not energized, the photosensitive means assumes a very large value of resistance which permits only a very small electrical potential to develop across the capacitive element, which results in maintaining the bilateral gate electrode controlled solid-state switch in a non-conductive condition.

The present invention also provides a monitoring circuit as described above wherein an electrical light is operatively and electrically connected in parallel with the photoemissive means. If the sequence of phases of the multi-phase electrical apparatus corresponds with the predetermined succession of phases, then the electrical light and the photoemissive means will become energized, thereby causing a decrease in the impedance value of the photosensitive means and thus causing more electrical potential to be developed across the capacitive element, which in turn will cause the bilateral gate electrode controlled solid-state switch to become conductive. If, on the other hand, the sequence of phases of the multi-phase electrical apparatus differs from the predetermined succession of phases, then the electrical light and the photoemissive means will remain non-energized which leaves the photosensitive means with a substantially high value of impedance, and thereby prevents the developing of any substantial electrical potential across the capacitive element, which results in leaving the bilateral gate electrode controlled solid-state switch in a non-conductive condition.

It is yet another object of the present invention to provide an electrical monitoring circuit, similar to that which is described above, and which is used in conjunction with a second source of electrical energy. A circuit is operatively and electrically connected across the second source of electrical energy, and such circuit includes a normally-open starting switch, a normally-closed stop switch, and a motor starter solenoid. A plurality of normally-open motor starter solenoid contacts are associated with the motor starter solenoid and are adapted to close upon energization of the motor starter solenoid and to remain open when the motor starter solenoid is not energized. The multi-phase electrical apparatus may comprise an electrical motor, and each of the normally-open motor starter solenoid contacts is operatively and electrically connected within the electrical conduction path of a different one of the plurality of input conductors of the electrical motor. The power electrodes of the bilateral gate electrode controlled solid-state switch are operatively and electrically connected across the starting switch. When the starting switch is momentarily closed, the motor starter solenoid will be energized causing the motor starter solenoid contacts to close, and thus completing the electrical conductive paths of the plurality of input conductors. This permits the transfer of electrical energy from the first-mentioned source of electrical energy to the motor, whereupon the electrical monitoring circuit then senses the phase relationship and determines whether or not the motor is rotating in the correct or desired direction. If the motor is rotating in the correct or desired direction, then the bilateral gate electrode controlled solid-state switch associated with the electrical monitoring circuit will conduct and thereby bridge the starting switch, so that even when the starting switch is no longer maintained in a closed position, the bilateral gate electrode controlled solid-state switch will maintain electrical power continuity to the motor starter solenoid. If the motor is not rotating in the correct or desired direction, then the bilateral gate electrode controlled solid-state switch will remain non-conducting. Consequently, when the starting switch is no longer held in the momentary closed position, the motor starter solenoid will become de-energized, and thus open the normally-open starter solenoid contacts, and thereby turn the motor to an OFF condition.

The present invention also provides a monitoring circuit wherein the first, third and fourth impedance means comprise resistors which have substantially equal values of resistance. The second impedance means comprises a capacitor, and the variable impedance element comprises a varistor. The bilateral gate electrode controlled solid-state switch comprises a triac. The electrical circuit means comprises the parallel combination of a light and the photoemissive means which may take the form of a lamp. The photosensitive means comprises a photosensitive resistor. The photosensitive resistor and the lamp comprise a photocell unit. The varistor protects the triac by minimizing the transients which would otherwise be applied to and damage the triac.

The present invention also provides a monitoring circuit similar to that described immediately above, wherein the electrical circut means includes a resistor connected in series with the parallel combination of the photoemissive means the light.

DETAILED DESCRIPTION OF SOME PREFERRED EMBODIMENTS OF THE INVENTION

Figure 1:
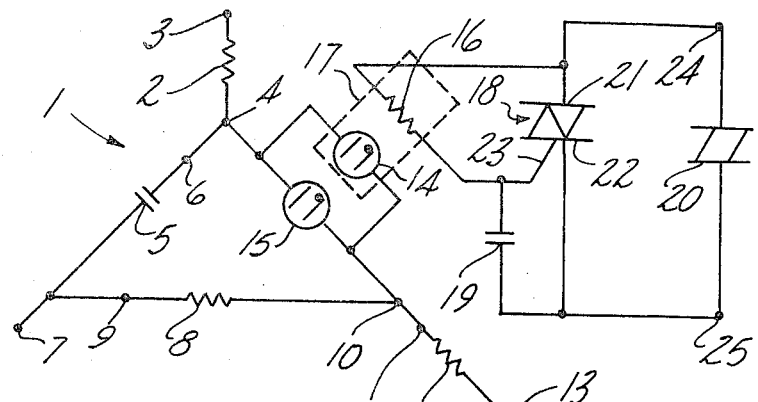
FIG. 1 illustrates an electrical schematic of an example of an electrical monitoring circuit according to a first embodiment of the present invention.

In the detailed description of the present invention set forth hereinbelow, like reference numerals are utilized to designate like components.

With reference to FIG. 1, there is illustrated an electrical monitoring circuit 1, according to a first embodiment of the present invention, for indicating the sequence of phases of a multi-phase electrical apparatus. There is shown first impedance means, such as a resistor 2 having first and second electrical terminals 3 and 4, respectively. There is also shown second impedance means, such as a capacitor 5 having first and second electrical terminals 6 and 7, respectively.

There is further shown third impedance means, such as a resistor 8 having first and second electrical terminals 9 and 10, respectively. Fourth impedance means, such as a resistor 11, is provided with first and second electrical terminals 12 and 13, respectively.

The second terminal 4 of resistor 2 is operatively and electrically connected to the first terminal 6 of the capacitor 5. The first terminal 9 of the resistor 8 is operatively and electrically connected to the second terminal 7 of the capacitor 5. The second terminal 10 of the resistor 8 is operatively and electrically connected to the first terminal 12 of the resistor 11.

Electrical circuit means is operatively and electrically connected between the second terminal 4 of the resistor 2 and the second terminal 10 of the resistor 8. The electrical circuit means includes photoemissive means, such as a lamp 14. The electrical circuit means may also include a light 15 which is electrically connected in parallel with the lamp 14.

Photosensitive means, such as a photosensitive resistor 16, is disposed in a predetermined spacial relation relative to the photoemissive lamp 14, whereby the impedance of the photosensitive resistor 16 varies as a function of the light emitted by the lamp 14. The photosensitive resistor 16 and the lamp 14 comprise a photocell unit 17.

Utilization means, including a bilateral gate electrode controlled solid-state switch or triac 18, a capacitive element 19, and a variable impedance element, such as a varistor 20, is operatively and electrically connected to the photosensitive resistor 16, whereby the utilization means is controlled by the impedance of the photosensitive resistor 16.

The triac 18 is provided with a first power electrode 21, a second power electrode 22, and a gate electrode 23. The photosensitive resistor 16 is operatively and electrically connected between the gate electrode 23 and the first power electrode 21 of the triac 18. The capacitive element 19 is operatively and electrically connected between the gate electrode 23 and the second power electrode 22 of the triac 18.

The varistor 20 is operatively and electrically connected between the first and second power electrodes 21 and 22, respectively, of the triac 18 which are also in electrical continuity with the output terminals 24 and 25 of the electrical monitoring circuit 1.

In a preferred embodiment of the invention, the resistor 2, the resistor 8, and the resistor 11 have substantially equal electrical impedance values.

Figure 2:
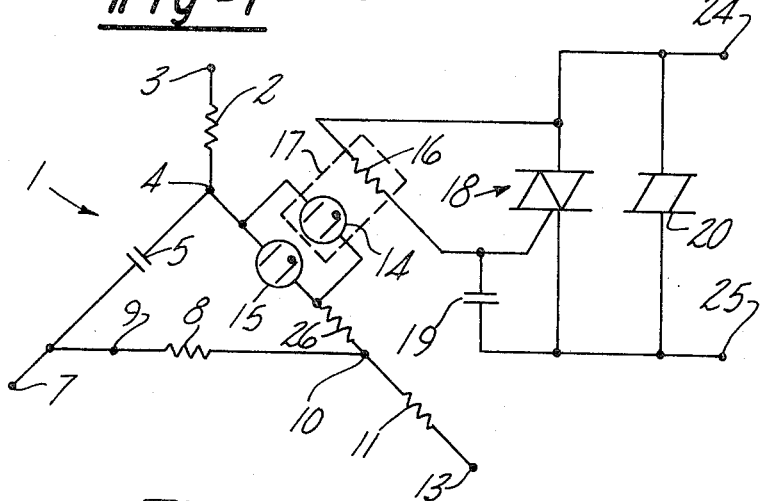
FIG. 2 illustrates an electrical schematic of another example of an electrical monitoring circuit according to a second embodiment of the present invention.

With reference to FIG. 2, there is shown an electrical monitoring circuit 1 which is somewhat similar to the monitoring circuit described above. However, in the monitoring circuit of FIG. 2 the aforementioned electrical circuit means which is operatively and electrically connected between the second terminal 4 of the resistor 2 and the second terminal 10 of the resistor 8 includes fifth impedance means, such as a resistor 26, connected in series with the parallel combination of the lamp 14 and the light 15. The electrical monitoring circuit in FIG. 2 works essentially similar to the monitoring circuit shown in FIG. 1, but the addition of the resistor 26 may necessitate a different selection for the light 15, that is, a light having different impedance values.

Figure 3:
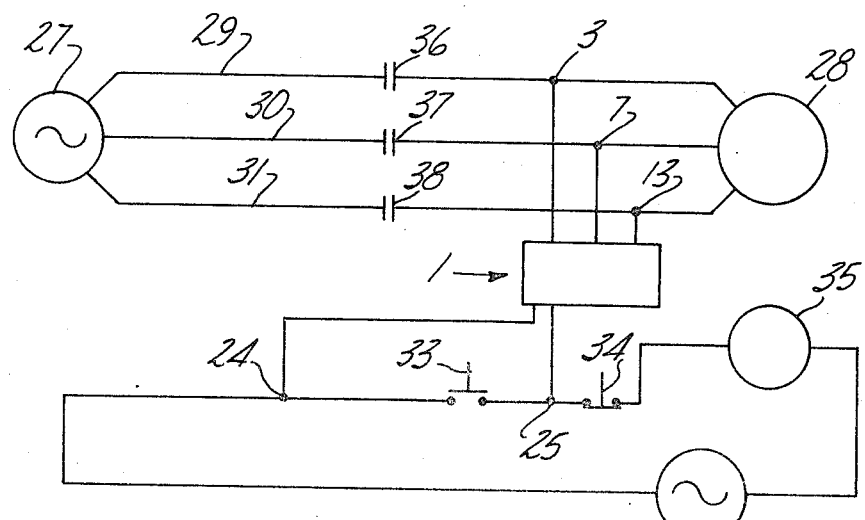
FIG. 3 depicts in electrical schematic form an electrical monitoring circuit for indicating the sequence of phases of a multi-phase electrical apparatus shown in conjunction with a three phase electrical motor and the control components thereof.

FIG. 3 illustrates a rotation monitor or electrical monitoring circuit 1 according to the present invention used in conjunction with other components for indicating the sequence of phases of a multi-phase electrical apparatus. There is shown a first source of electrical energy, such as a three-phase alternating current source 27. A multi-phase electrical apparatus, such as a three-phase electrical motor 28, is operatively and electrically connected to the first source 27 of electrical energy.

The motor 28 is provided with a plurality of input conductors, such as a first input conductor 29, a second input conductor 30, and a third input conductor 31.

In FIG. 3 there is shown a rotation monitor or electrical monitoring circuit 1 which may take the form of the embodiments shown in FIGS. 1 or 2, or a modification or variation thereof embodying the essential principles of the present invention. It should be noted that the first electrical terminal 13 of the resistor 2 is operatively and electrically connected to the first input conductor 29 of the motor 28. Similarly, the second electrical terminal 7 of the capacitor 5 is operatively and electrically connected to the second input conductor 30 of the motor 28; and the second electrical terminal 15 of the resistor 11 is operatively and electrically connected to the third input conductor 31 of the motor 28. In operation of the FIG. 3 apparatus, the lamp 14 and the light 15 will become energized when the sequence of phases of the motor 28 is in a predetermined or correct succession of phases. Conversely, the lamp 14 and the light 15 will not become energized the sequence of phases of the motor 28 differs from the predetermined or correct succession of phases.

FIG. 3 also illustrates a second source of electrical energy, such as an alternating current source 32. A circuit is operatively and electrically connected across the second alternating current source 32, and this circuit may include a normally-open starting switch 33, a normally-closed stop switch 34, and a motor starter solenoid 35.

A plurality of normally-open motor starter solenoid contacts 36, 37 and 38 are associated with the motor starter solenoid 35, and are adapted to close upon energization of the motor starter solenoid 35 and to remain open when the motor starter solenoid 35 is not energized. Each of the normally-open motor starter solenoid contacts 36, 37 and 38 is operatively and electrically connected within the electrical conduction path of a different one of the input conductors 29, 30 and 31, respectively, of the motor 28.

It should be noted in FIG. 3 that the power electrodes 21 and 22 of the triac 18, which are electrically the same as the output terminals 24 and 25 of the rotation monitor 1, are operatively and electrically connected across the normally-open starting switch 33.

A more thorough understanding of the present invention may be gleaned by the description of operation and functioning of the FIG. 3 apparatus which is set forth hereinbelow.

In a normal mode of operation of the FIG. 3 circuitry, in order to start the motor 28, an operator or something is needed to close the momentary starting button or starting switch 33. This results in the energization of the motor starter solenoid 35, which in turn causes the motor starter solenoid contacts 36, 37 and 38 to close, thus transmitting electrical power from the three-phase alternating current source 27 to the three-phase motor 28.

The electrical monitoring circuit or rotation monitor 1 new senses the phase relationship and determines whether or not the motor 28 is rotating in the correct or desired or predetermined direction.

If the motor 28 is rotating in the correct direction, then the triac 18 (see FIGS. 1 and 2) associated with the rotation motor 1 turns ON, thus bridging the normally-open motor starting switch 33. When the operator takes his hand off of the starting switch or button 33, the triac 18 will now maintain power continuity from the alternating current source 32 to the motor starter solenoid 35. In this condition, the circuit is said to be "sealed in."

If, on the other hand, the motor 28 started to rotate in the incorrect direction, and the rotation monitor 1 determined that the phase relationship was incorrect, then the triac 18 associated with the rotation monitor 1 would remain in an OFF or non-conductive condition. In such a circuit condition, when the operator removes his hand from the momentary starting button 33, the motor starter solenoid 35 would be de-energized, resulting in the opening up of the motor starter solenoid contacts 36, 37 and 38, and thereby turning the motor 28 OFF.

The functioning and operation of the embodiments illustrated in FIGS. 1 and 2 will now be described in greater detail.

When electrical terminals 3, 7 and 13 are connected across a three-phase alternating current power source, one of two conditions will transpire.

If the phase relationship is correct, then the lamp 14 associated with the photocell unit 17 and the light 15 will come ON. Because the unit 17 is a photocell, the photoresistor 16 associated with the photocell unit 17 will decrease in value when the lamp 14 is ignited. A decrease in the impedance of the photoresistor 16 causes more voltage to be developed across the capacitive element 19, and this increase in potential will place the triac 18 in a conductive condition.

The photocell unit 17 operates as follows. When its lamp 14 is OFF, the photoresistor 16 assumes a relatively very high value of resistance. When the lamp 14 is ignited, the photoresistor 16 decreases to a very low value. In a preferred embodiment of the present invention, the resistance ratio can vary as 1 to 1,000,000, approximately.

If the phase relationship is incorrect, then neither the lamp 14 nor the light 15 will ignite. The photoresistor assumes a high value of resistance as sated above. This allows little or not voltage to develop across the capacitive element 19. As a result of this, the triac 18 will remain in a non-conductive condition.

The function of the varistor 20 is to protect the triac 18 from transients. Without the varistor 20, it is possible that the triac 18 may be severely damaged or destroyed. With the use of the varistor 20, the transients are kept to a minimum.

In a preferred embodiment of the present invention, the photocell unit 17 is completely closed so that the lamp 14 and the photosensitive resistor 16 are not visible. In such an embodiment, the purpose of the light 15 is to give a visual indication to the operator of the phase relationship of the source or apparatus being tested.

To facilitate further understanding of the embodiments shown in FIGS. 1, 2 and 3, there is set forth below some typical components and values of components to enable a person skilled in this area of technology to practice the present invention.

Resistors 2, 8 and 11 may be 56OK ohm, ¼ watt, 10 percent resistors.

Capacitor 5 may be a 0.008 microfarad, 600 volt DC capacitor, such as a Sprague 6PS-D80 capacitor.

The photocell unit 17 may be a Clarex, photomod CLM 4120A photocell unit, which is completely covered.

The capacitive element 19 may be a 0.10 microfarad, 200 volt DC capacitor, such as a Sprague 2PS-P10 capacitor.

The triac 18 may be an RCA Triac 40669.

The varistor 20 may be a suitable metaloxide varistor such as a G.E. VP130A10 varistor.

In FIG. 3, the first source of electrical energy 27 may be a 440 volt alternating circuit, three-phase, 60 cycle per second electrical source.

The second source of electrical energy 32, may be a conventional 110 volt alternating current, 60 cycle power source.

In the FIG. 1 embodiment, the light 15 may be a Dialco Lamp 249-7840-0933-504.

In the FIG. 2 embodiment, the light may be a Dialco Lamp 249-7841-0933-574.

As mentioned above, the purpose of the varistor 20 is to supress voltage transients which occur when the triac 18 is turned ON and OFF. In essence, the varistor dissipates the energy stored in the load connected to the triac 18. It should be noted that the load can be connected to either side of the triac 18.

The present invention also contemplates reversing the energization of the neon light 15 to provide a visual indication of correct or incorrect phase sequence. In other words, the light can be arranged to be ignited when the phase sequence is incorrect, if desired.

It should also be borne in mind that the rotation monitor 1 of the present invention can be utilized in connection with a myriad of different multi-phase electrical devices, in addition to three-phase electrical motors.

I claim:

1. An electrical monitoring circuit for indicating the sequence of phases in a three-phase apparatus comprising: first, second, and third impedance means connected into a delta circuit for connection across the phases of said three-phase apparatus;
    said first and second impedance means having fixed impedance values;
    said third impedance means including variable impedance means responsive to the sequence of phases of said apparatus, the impedance of said variable impedance means varying from a high value when an incorrect phase sequence is indicated and a low value when a correct phase sequence is indicated;
    said variable impedance means including an energy emitting element and an energy sensitive element, said energy emitting element emitting energy when the sequence of phases is correct so that the impedance of said energy sensitive element decreases in response to said energy;
    and utilization means responsive to said energy sensitive means to indicate the existance of the desired sequence of phase.

2. The circuit of claim 1 wherein said energy emitting element is a light emitting element and said light sensitive element is light sensitive.

3. The circuit of claim 2 wherein said utilization means includes switching means responsive to said energy sensitive means for connecting said apparatus to a three-phase source when said sequence of phases is correct.

4. The circuit of claim 2 wherein said first impedance means is a reactive element.

5. The circuit of claim 2 further including first resistance means for connecting said first and third impedance means to said three-phase apparatus; and second resistance means for connecting said second and third impedance means to said three-phase apparatus.

* * * * *